J. TAUSCHER.
POKE.
APPLICATION FILED MAR. 15, 1911.
1,041,372.
Patented Oct. 15, 1912.
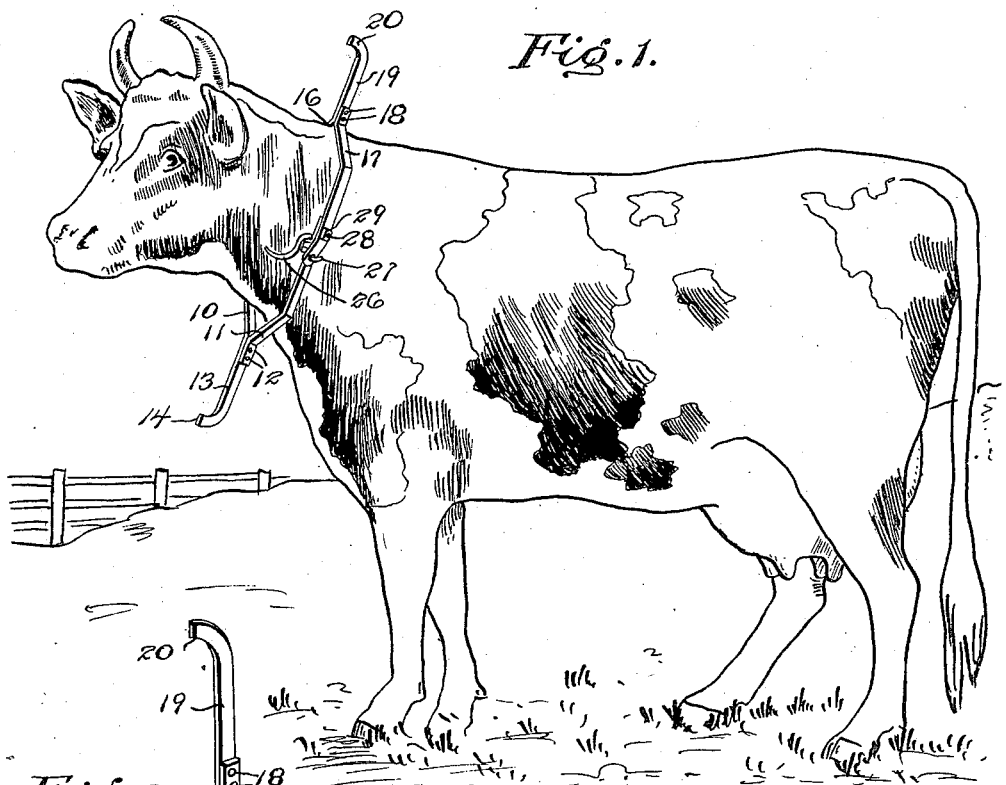
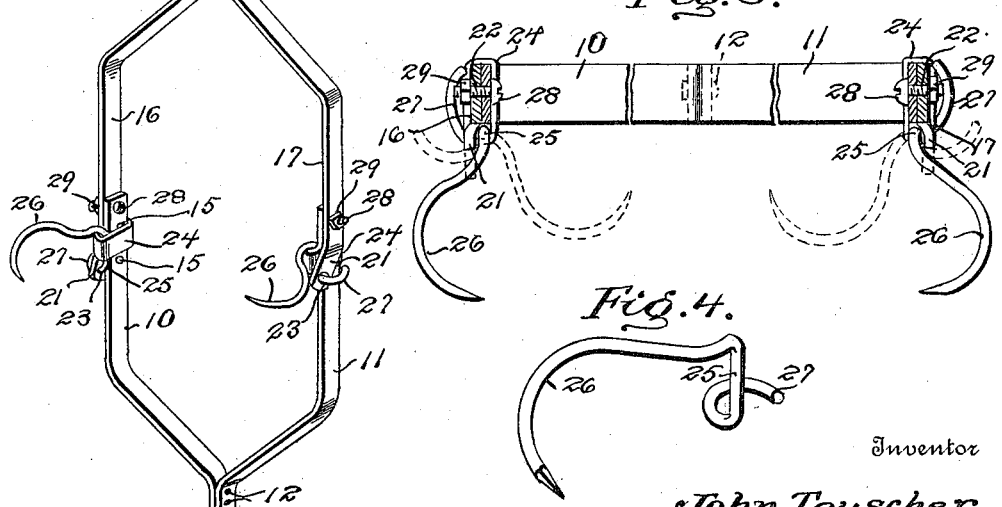
Witnesses
Inventor
John Tauscher.
By
Attorneys.
COLUMBIA PLANOGRAPH CO., WASHINGTON, D. C.

UNITED STATES PATENT OFFICE.

JOHN TAUSCHER, OF ELLIS, KANSAS.

POKE.

1,041,372.

Specification of Letters Patent.

Patented Oct. 15, 1912.

Application filed March 15, 1911. Serial No. 614,738.

*To all whom it may concern:*

Be it known that I, JOHN TAUSCHER, a citizen of the United States, residing at Ellis, in the county of Ellis and State of Kansas, have invented certain new and useful Improvements in Pokes, of which the following is a specification.

This invention relates to an improved animal poke adapted particularly to cattle, horses, mules and the like, and has for an object to provide a simply constructed device automatic and positive in operation to bring a pair of spurs against the neck of an animal when the head is inserted through fences and other devices from which the animal is to be kept.

Another object of this invention is to provide a poke in which the spurs will be released from the neck of the animal as soon as the head is withdrawn from the fence, the spurs being released by the free hanging of the poke about the neck of the animal, and without the addition of weights, springs, or other like appurtenances.

A further object of this invention is to provide a poke which is adjustable to stock of various sizes, the adjustment being dependent only on the position of a pair of detachable hinge-bolts.

For a full understanding of the invention and the merits thereof and also to acquire a knowledge of the details of construction, reference is to be had to the following description and accompanying drawings, in which:

Figure 1 is a perspective view of the improved poke as applied to an animal; Fig. 2 is a detail perspective view of the poke looking toward its forward side; Fig. 3 is a horizontal section taken through the poke midway of its ends; and, Fig. 4 is a detail perspective view of one of the supporting members.

Corresponding and like parts are referred to in the following description and indicated in all the views of the drawing by the same reference characters.

Referring to the drawing, the improved poke comprises upper and lower yokes, the lower yoke consisting of spaced arms 10 and 11 converging and meeting at their lower ends, and being held rigidly together by rivets 12. The arm 10 extends considerably below the end of the arm 11 to provide an extension 13 curved forwardly at its lower extremity to provide an engaging hook 14. The upper ends of the arms 10 and 11 are provided with series of registering openings 15 for a purpose hereinafter described.

The upper yoke consists of spaced arms 16 and 17 converging and meeting at their upper ends, and being rigidly secured together by rivets 18. The arm 16 is provided with an extension 19 upon its upper end which is curved forwardly to provide an engaging hook 20. The lower ends of the arms 16 and 17 are curved forwardly as at 21, and are offset outwardly from the arms. Openings 22 are formed through the lower ends of the arms 16 and 17, and enlarged openings 23 are formed through the lower ends of the curved portions 21. Sleeves 24 are slidably disposed upon the arms 10 and 11 of the lower yoke and are flat to snugly engage against the opposite sides of the arms. The forward edges of the sleeves are spaced from the edges of the arms 10 and 11, and are rounded for the reception of the depending shanks 25 of a pair of spurs 26. The lower ends of the shanks 25 terminate in horizontal arcuate arms 27 loosely engaging through the openings 23 of the curved portions 21. The spurs 26 and the arcuate arms 27 are preferably integrally formed with the shanks 25 and comprise lengths of heavy wire bent into required form.

Detachable hinge-bolts 28 are positioned through the openings 15 and 22 of the lower and upper yokes respectively. Nuts 29 are secured upon the outer ends of the bolts 28. It will be noted that the bolts 28 are inserted through the arms of the yokes from the inside so as to present the smooth rounded heads of the bolts against the neck of the animal, and to facilitate the removal of the nuts 29.

When the yokes are assembled the sleeves 24 engage against the inner sides of the curved portions 21, which are offset to accommodate the same, so as to register the horizontal arcuate arms 27 with the openings 23. The sleeves 24 are held in position upon the arms 10 and 11 by the curved portions 21 and move along the arms with the links when the yokes are contracted or moved apart in adjusting the bolts 28 through the openings 15.

The weight of the lower yoke is adapted to hold the same in vertical registration with the upper yoke and to thereby normally extend the curved portions 21 from the forward edges of the lower yoke. This position of the curved portions 21 rotates the shanks 25, by the arms 27, to swing the spurs 26 out from the neck of the animal. When the extensions 13 and 19 are brought into engagement with the bars or strands of a fence, the yokes are swung back about the hinge-bolts 28 and move the curved portions 21 forwardly to swing the arcuate arms 27 in and move the spurs 26 into engagement with the neck of the animal. As soon as the extensions 13 and 19 are released, the lower yoke, by its own weight, swings back into vertical position and moves the sleeves 24 and the spur members back into normal position carrying the spurs 26 out of engagement with the neck of the animal.

It will be noted that the spurs 26 are curved inward and that they are located at the forward edges of the poke so that the pushing forward of the animal through the fence tends to drive the points of the spurs farther into its neck.

Having thus described the invention, what is claimed is:

1. A poke including an upper member having an upper extension, a lower member hinged upon the lower end of the upper member and having a depending extension, spurs carried upon the lower member, and arms connected to the spurs for engagement with the lower extremity of the upper member to move the spurs upon the swinging of the members.

2. A poke comprising pairs of spaced arms converging at their outer ends and being secured together, one of the arms of each pair projecting beyond the opposite arm of each pair to provide extensions, the arms of one pair being hingedly connected to the free ends of the arms of the opposite pair, sleeves slidably disposed about the ends of one of the pairs of arms, spurs hinged upon the sleeves and having curved arms engaging the extremities of the opposite pair of arms, and detachable hinge-bolts engaging through the adjacent ends of the arms for hingedly connecting the same whereby the swinging of the arms out of alinement throws the spurs inward.

3. A poke comprising a pair of yokes, adjustable hinge-bolts engaging through the free ends of the yokes to hingedly connect the same, sleeves carried about the ends of one of the yokes, spurs hinged through the sleeves and having outstanding arms engaging with the ends of the opposite yoke, and rigid extensions projecting through the outer ends of the yokes for swinging the same out of alinement.

4. A poke including an upper member having an upper extension, a lower member hinged upon the lower end of the upper member and having a depending extension, spurs carried upon the lower member, and means connecting the spurs with the lower extremity of the upper member to move the spurs upon the swinging of the members.

In testimony whereof I affix my signature in presence of two witnesses.

JOHN TAUSCHER. [L. S.]

Witnesses:
J. S. NICHOLSON,
M. E. SMITH.

---

Copies of this patent may be obtained for five cents each, by addressing the "Commissioner of Patents, Washington, D. C."